(12) United States Patent
Caneba et al.

(10) Patent No.: US 6,869,983 B2
(45) Date of Patent: Mar. 22, 2005

(54) SPATIALLY CONTROLLED, IN SITU SYNTHESIS OF POLYMERS

(75) Inventors: Gerard T. Caneba, Houghton, MI (US); Vijaya Raghavan Tirumala, Glendale Heights, IL (US); Derrick C. Mancini, Riverside, IL (US); Hsien-Hau Wang, Downers Grove, IL (US)

(73) Assignee: The University of Chicago, Chicago, IL (US)

(*) Notice: Subject to any disclaimer, the term of this patent is extended or adjusted under 35 U.S.C. 154(b) by 100 days.

(21) Appl. No.: 10/458,344

(22) Filed: Jun. 10, 2003

(65) Prior Publication Data

US 2005/0043428 A1 Feb. 24, 2005

(51) Int. Cl.[7] .................................................. C08F 2/46
(52) U.S. Cl. ........................ 522/175; 522/173; 522/1; 522/71; 522/74; 522/178; 522/182; 522/184; 522/188; 522/910; 522/104; 522/107
(58) Field of Search ........................ 522/1, 6, 71, 74, 522/104, 107, 173, 175, 178, 182, 188, 910

(56) References Cited

U.S. PATENT DOCUMENTS 5,173,551 A * 12/1992 Caneba ...................... 526/208

* cited by examiner

*Primary Examiner*—James J. Seidleck
*Assistant Examiner*—Sanza L. McClendon
(74) *Attorney, Agent, or Firm*—Foley & Lardner LLP

(57) ABSTRACT

An in situ polymer microstructure formation method. The monomer mixture is polymerized in a solvent/precipitant through exposure to ionizing radiation in the absence any chemical mediators. If an exposure mask is employed to block out certain regions of the radiation cross section, then a patterned microstructure is formed. The polymerization mechanism is based on the so-called free-radical retrograde-precipitation polymerization process, in which polymerization occurs while the system is phase separating above the lower critical solution temperature. This method was extended to produce a crosslinked line grid-pattern of poly (N-isopropylacrylamide), which has been known to have thermoreversible properties.

17 Claims, 12 Drawing Sheets

SPATIALLY CONTROLLED, IN SITU SYNTHESIS OF POLYMERS

The United States Government has certain rights in this invention pursuant to Contract No. W-31-109-ENG-38 between the U.S. Department of Energy and The University of Chicago representing Argonne National Laboratories.

FIELD OF INVENTION

The invention relates to the synthesis of polymers, more specifically to the spatially controlled synthesis of a particular form of polymers known as "smart" polymers.

BACKGROUND OF THE INVENTION

Hydrogels are polymers that can absorb and retain water, many times their own mass. So called "smart" polymers respond to external stimuli like temperature, pH, etc, with a change in their size or shape. Thermoreversible hydrogels are a subclass of hydrogels that can reversibly swell or shrink with a change in temperature.

Hydrogels have been shown to be highly biocompatible, due to their ability to sorb large amounts of water. They are usually available in the form of dense, porous materials. Normally, hydrogels are molecularly crosslinked through covalent or ionic bonds. They are also classified in terms of their solubility or swelling characteristics. In particular, the thermoreversible hydrogel exhibits decreased (increased) solubility or swelling in water as the temperature is increased (decreased), due to reversible phase transformation at the lower critical solution temperature. Hydrogels are "smart" materials because they can respond with a change of shape or size to an external stimulus of a wide variety of parameters, such as temperature, pH, moisture, magnetic or electric field, or even a pulse of an intense laser beam. Conventional methods of synthesis and fabrication of these hydrogels results in gel-like products, the shape or size of which cannot be controlled as desired. Conventional methods of synthesis and fabrication of these hydrogels is carried out by milling down bulk hydrogels, or by synthesizing them in containers of the desired shape or size.

Free radical precipitation polymerization, which occurs above the lower critical solution temperature is characterized by: (1) a poor solvent environment to aid in polymer precipitation; (2) the polymerization taking place above the lower critical solution temperature, wherein the phase envelope deepens with an increase in temperature and molecular weight of the polymer; and (3) an exothermic chain reaction drives the polymer deep into the phase envelope, with the reaction being predominantly diffusion controlled. Conventional polymerizing systems occur below the single-phase miscible region. Deep X-ray lithography is conventionally used to produce metallic microstructures based on LIGA (a German acronym for Lithographic Galvanoformung Abformung, or lithography electroplating molding). Major aspects of deep x-ray lithography include: (1) mask making, i.e. photolithography and electroplating; (2) spin coating of the resist (polymer) layer on the substrate (for example Poly(methyl methacrylate or SU-8 (3) exposure through the x-ray mask; and (4) developing the resist layer.

There is therefore a need for a method to produce "smart" polymer patterns with unique responsive properties. A nanoscale technique is needed for polymer synthesis that is cost-effective and more efficient then the current macro or micro-scaled techniques.

SUMMARY OF THE INVENTION

One aspect of the present invention relates to producing "smart" polymer patterns with unique response properties. In a preferred embodiment of the invention, hydrogels are fabricated in desired shapes and sizes in situ, without the need for a chemical initiator. The free radical retrograde precipitation polymerization reaction is used in combination with a ionizing energy source to synthesize the desired polymer. For example, hydrogels based on N-isopropylacrylamide can be fabricated using ionizing radiation, such as hard x-rays, as the initiation source for the free radical retrograde precipitation polymerization reaction. Since the polymers are formed only in the irradiated zones and with no reaction spread, there is minimum waste from this process. In a further preferred embodiment, a radiation mask can be used in conjunction with radiation initiation of the polymerization reaction to create intricate polymer designs. Recent developments include photopolymerizing monomers using a photomask, in a process similar to that of photolithography. However, such a process is limited to producing low aspect ratio structures and cannot be extended to synthesis of thick and stand alone hydrogel micro or nanopatterns.

Hydrogels with good structural stability and aspect ratio can be fabricated in microscale, which can respond to an external stimulus. The hydrogels fabricated in accordance with the present invention show a response that is faster relative to conventional hydrogels. Making minor modifications in the chemical composition of the hydrogels, these can be turned active to other external stimuli. In a preferred embodiment of the invention, poly (N-isopropylacrylamide) structures of approximately 100 micron size can be synthesized. These structures can swell up to almost 50% in water. In some cases, these structures can even close pores or channels that are of 50 micron size, and open-up again in the absence of water. When these structures are left in water at room temperature for equilibration, they can show a sharp change in their size at temperatures higher than 35° C. Since these structures are three-dimensional, binding them in two dimensions can increase the size change as dimensionally required. Conventionally, hydrogels produced in accordance with the present invention can be used as drug delivery systems, thermal switches, absorbers, thermal DNA separation systems or tertiary oil recovery. Additionally, these microfabricated hydrogels can also be used as flow control valves, thermal or moisture sensors, or incorporated in any device later.

DETAILED DESCRIPTION OF THE PREFERRED EMBODIMENTS

The use of thermoreversible gels have been reported for hydrogels and hydroplastics. Thermosensitive hydrogels are biodegradable in water and can be used in controlled drug delivery, controlled release, recovery, and extractions applications. A variation of the basic microstructure formation process involves the formation of a phase-separated gel (based on cellulose ether in water) above a lower critical solution temperature in a formulation that includes crosslinking agents, such as ethylene glycol dimethacrylate. Patterned thermoreversible hydrogels are a new class of materials that have important utility in biomedical, pharmaceutical, and bioseparations applications. With patterning, especially in conjunction with micro- and nanofabrication, thermoreversible hydrogels could be used in microfluidic applications and other biocompatible nanotechnological systems.

Figure 1:
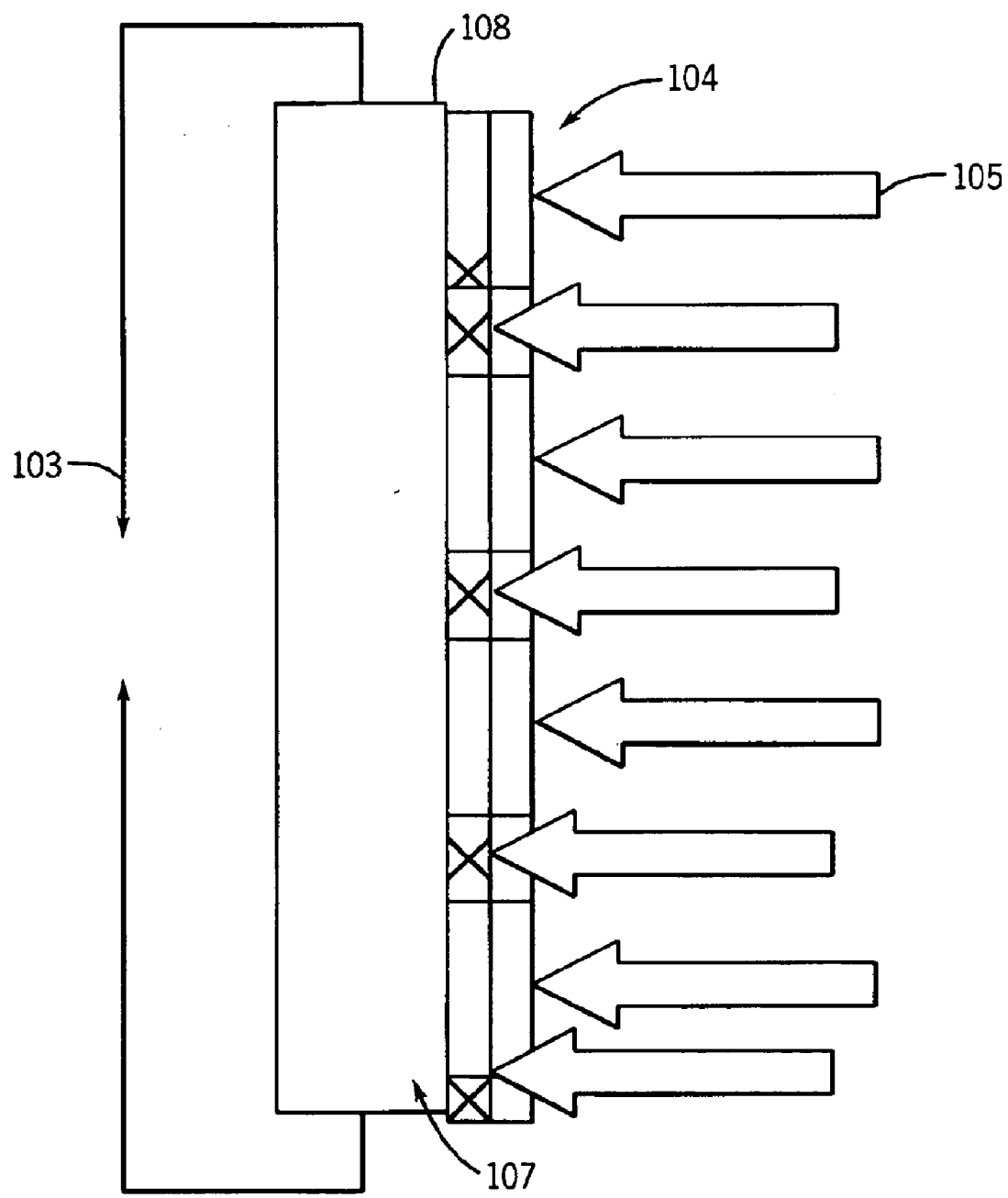
FIG. 1 depicts a schematic of an experimental setup for synchrotron-radiation-induced, spatially controlled polymerization.

In a preferred embodiment of the invention and as depicted in FIG. 1, x-rays from a synchrotron radiation source 105 pass through a radiation mask 104 to the silicon wafer assembly 108 which contains the monomer solution. The silicon wafer assembly 108 is mounted on an aluminum backing plate 107 with a circulating glycerol bath 103.

One aspect of the present invention is a combination of "bottom up" synthesis of various polymers, for example, without limitation, styrene, methyl methacrylate, hydroxyethyl methacrylate, acrylamides, butyl acrylate, and acrylic acid, and "top-down" (spatially controlling the exposure via lithography) approaches of patterning a thermoreversible hydrogel microstructure using ionizing energy radiation, such as synchrotron radiation, to initiate the polymerization reaction. The system polymerizes in the phase envelope above the miscible region unlike conventional systems which polymerize below the miscible region. The internal structure of the spatially controlled polymers can be controlled by polymerization-induced phase separation above the lower critical solution temperature. Preferably, a suitable solvent is selected such that the polymer-rich phase of the admixture is phase-separated above the lower critical solution temperature during polymerization. The lower critical solution temperature is the temperature above which a polymer will become less soluble in a solvent/polymer admixture as the temperature is increased.

In a preferred embodiment, the solvent should preferably be such that the viscosity allows mixing and chain transfer to solvent is minimized. The chemistry is based on a free-radical chain polymerization method called the free-radical retrograde-precipitation polymerization process. An admixture of reactants, including monomer and solvent, but also possibly including fillers such as metallic nanoparticles, is prepared prior to initiation of this polymerization reaction. The solvent should be compatible with both the monomer and any reactants such as metallic nanoparticles, but incompatible with the formed polymer. This preferred process is characterized by the following features: (1) gradual increase of conversion vs. time even under gel-effect conditions; (2) local heating around the radical site: (31 reduced rate of propagation, as well as rate of radical-radical termination; (4) relatively narrow molecular weight distributions; and 15) existence of live radicals that could be exploited for production of block copolymers.

Figure 2:
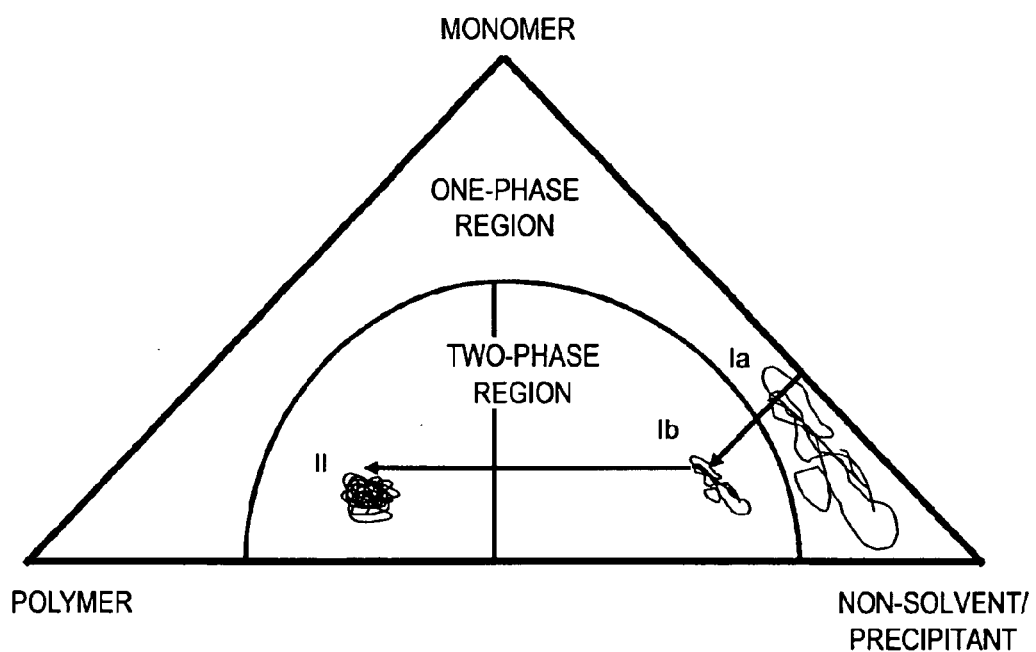
FIG. 2 illustrates a reaction trajectory in a ternary polymer-monomer-solvent phase diagram showing depicted polymer chain configurations at various points in the system.

FIG. 2 shows the reaction trajectory along which a free-radical retrograde-precipitation polymerization process system traverses in a retrograde phase envelope showing a dilute solution regime; dilute polymer collapsed coil, and agglomerated collapsed coil. Unlike conventional precipitation systems, in free-radical retrograde-precipitation polymerization process, reaction exotherm favors the coil-to-globule transition, thus trapping the growing polymer radicals in a severely coiled globule. In conventional polymerizing systems, N-isopropylacrylamide is polymerized below the lower critical solution temperature causing gelation to set in immediately, forming a bulk film. By polymerizing N-isopropylacrylamide in a retrograde precipitating environment, gelation can be controlled with increase in conversion. Synthesis of poly(N-isopropylacrylamide) above the lower critical solution temperature also opposes the formation of surface skin, a phenomenon characteristic of conventional hydrogels, making these materials useful for in situ and in vivo bio-applications.

The initiation source can be any ionizing energy radiation: in one particular embodiment when an electron beam from a scanning electron microscope is used, hydrogel nanostructures can be produced. Most of the polymerizing systems initiated by x-rays or γ-rays are reported to have formed free-radical species, and a few systems form ionic species depending upon the operating conditions and the solvents used. After radiation-based initiation of a system that is above the lower critical solution temperature of the growing polymer, control over the propagation of the polymer chains is expected to result in the confinement of the polymer domains within the exposed area (following a free-radical retrograde-precipitation polymerization process mechanism). Use of hard x-rays from a synchrotron radiation source provides the ability of forming relatively thick patterned layers of the polymer. Soft x-ray initiation leads to finer lateral resolution. (Hard x-rays are the highest energy x-rays, while the lower energy x-rays are referred to as soft x-rays. Hard x-rays are typically those with energies greater than around 5 keV.)

Since the x-ray source can produce relatively small wavelength radiation (wavelengths as small as 1 nanometer) at very high intensities, fine structures can be advantageously produced. The dose (or time of exposure) controls the pore-size of the resulting hydrogel, thus defining its swelling transition rates. Generally, if the solution is near the solubility threshold of the monomer, then there is an inverse relationship between dosage and pore size, and thus swelling. The resulting material can be used as a microporous, fast-response gel with tailored response.

The effect of mixing on the reaction propagation and termination in free-radical retrograde-precipitation polymerization is well known in the art. Mixing has an effect on reaction propagation and agglomeration of precipitates. Absence of mixing was shown to have effected the preservation and isolation of the globular precipitates. In a quiescent fluid, i.e. in the absence of mixing, mass transfer is translational-diffusion controlled. Therefore, when the monomer is unavailable, agglomeration of the globules is possible only if the growing reactive domains actually interact with each other. Thus, the reactive domains in a quiescent system would have to grow and overlap each other in order to agglomerate. Unlike from a well-mixed reactor, nanoparticles were therefore observed from a quiescent fluid system, even after one half-life of the initiator.

Radiation-initiated reactions above the lower critical solution temperature also minimize the spread of the reaction in a quiescent fluid system. In the absence of chemical mediators, ionizing radiation can be used to selectively initiate specific regions and thus spatially control the reaction. In a chemical initiation system, the distributed heat from the reaction exotherm results in little rise in local temperature thus affecting polymerization and the ultimate polymer structure. On the other hand, in radiation-induced polymerization above the lower critical solution temperature, monomers are initiated uniformly through out the exposed regions resulting in high termination rates by combination, due to equal radical reactivaties and thus low propagation rates due to precipitation in exposed regions. This also results in higher local temperatures since the exposed regions now promote propagation and termination reactions, which are exothermic in nature. Thus, polymer chain collapse in radiation-initiated retrograde precipitating systems is aided by the continuous initiation inasmuch as it is by the exothermic reaction. Since reaction control in free-radical retrograde-precipitation polymerization mainly depends on the local thermal gradients, radiation-induced polymerization systems above the lower critical solution temperature offer better control over the polymerization reaction, apart from the possibility of selective initiation for patterning.

EXAMPLE 1

Chemically Initiated Polymerization of N-isopropylacrylamide in a Quiescent-Fluid Reactor This example illustrates that the primary structure of polymeric domains produced from quiescent FRRPP systems is that of relatively stable nanometer scale particles (as shown in V. Tirumala, Y. Dar, H. -H. Wang, D. Mancini, and G. T. Caneba, "Nanopolymer Particles from a Controlled Polymerization Process", *Advances in Polymer Technology*, 22, 126 (2003)). The laboratory work for example 1 was carried out at Michigan Technological University, Department of Chemical Engineering. N-isopropylacrylamide was polymerized in a 1/16 th inch-outside diameter (OD) tube reactor, which is assumed to maintain a quiescent fluid. A 0.08 grams of monomer mixture along with 0.3 milligrams of azo-initiator 2,2'-azobis(2(2-imidazolin-2-yl)propane) (VA-044) was dissolved per 1 milliliter of water. A crosslinker, ethylene glycol dimethacrylate (EGDMA), was added at 10% (wt./wt.) to the monomer. Nitrogen gas was bubbled through the reactive mixture for about 15 minutes to remove dissolved oxygen. The tube reactor was tightly sealed on one end, while the other end was connected to an Eldex™ metering pump. Pumping of the reactive mixture was carried out for exactly 5 minutes at a rate of 1 milliliter/minute. The other end of the reactor was then sealed and the tube reactor was immersed in a hot water bath, maintained at 45° C. After. 20 minutes the reactor product was pushed out by pumping in water at 45° C. through the reactor. The product was collected on a silicon wafer at liquid nitrogen temperature (~–200° C.). Then, it was freeze-dried in a mixture of xylenes and liquid nitrogen slush at –40° C. The freeze-dried product was then analyzed using an atomic force microscope.

Figure 3:
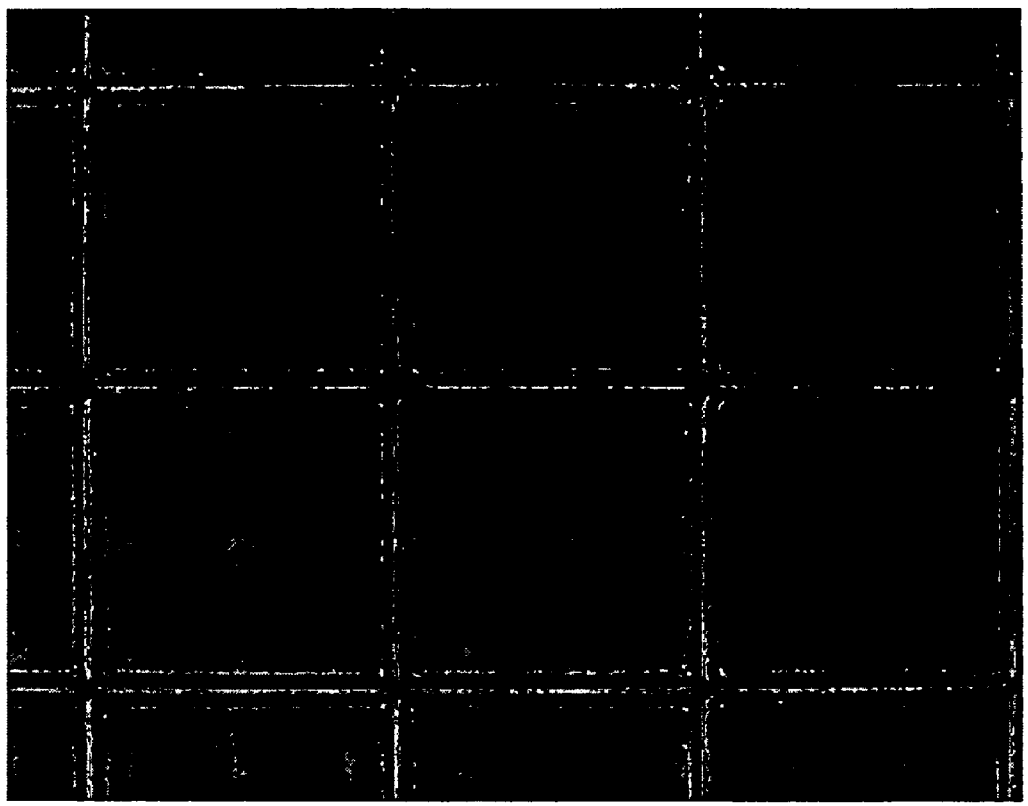
FIG. 3 is a representation of a 25-micrometer grid pattern, polymerized from N-isopropylacrylamide, at 50° C., wherein the distance between the lines is 500 micrometers.

FIG. 3 shows the atomic force microscope images of the freeze-dried poly(N-isopropylacrylamide-co-ethylene glycol dimethacrylate) nanoparticles. Particle analysis of the images indicates the persistence of nanopolymer particles with a mean radius of gyration of 30–35 nanometers. Styrene systems resulted in nanoparticles with no agglomeration. However, in the case of N-isopropylacrylamide, some agglomeration is observed, which might be an after-effect induced during the freeze-drying of aqueous solution. When the freeze-drying temperature is relatively low, water forms crystallites encompassing the dispersed nanoparticles. While freeze-drying, water sublimates from the crystalline phase, leaving the agglomerated particles behind.

EXAMPLE 2

Synchrotron-Radiation-Induced Polymerization of Low Aspect-Ratio Hydrogel Microstructures A mixture containing 20-wt % N-isopropylacrylamide, 2 wt % calcium-methacrylate, and 78-wt % water was used for preliminary patterned polymerization work. Calcium methacrylate, which acts a crosslinking agent, was produced by neutralizing methacrylic acid with calcium hydroxide. Nitrogen gas was bubbled through this mixture to remove the dissolved oxygen in order to prevent oxygen from terminating the free radicals generated upon irradiation of the monomer mixture.

Figure 4:
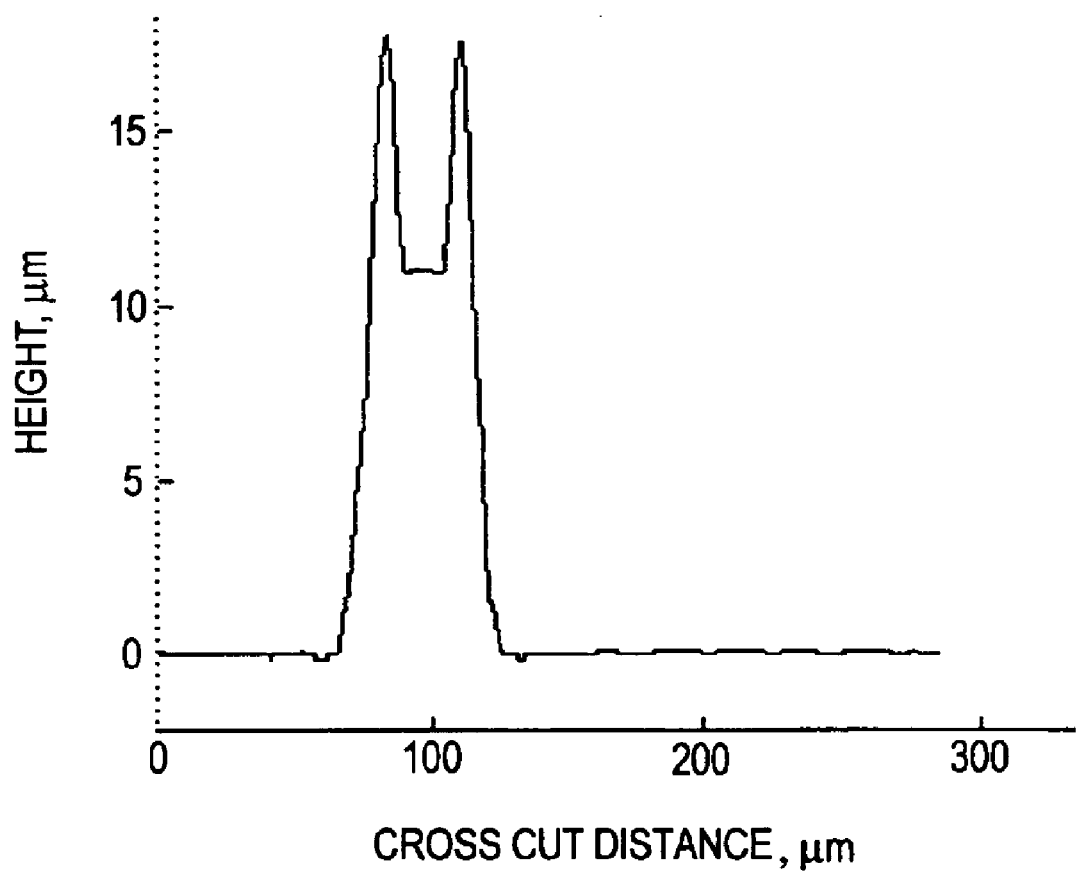
FIG. 4 is a plot of photons per second per mrad$^{o2}$ versus photon energy using a chromium mirror at 0.15 degree from horizontal, and a 1-millimeter graphite filter.

The reactive fluid was sandwiched between two 4-inch silicon wafers, one of which had an oxidized surface. An oxide surface is used to promote adhesion of the fluid and thus the polymerized pattern. The sides of the sandwich of wafers and reactive fluid were sealed with a Kapton® tape. Spatially controlled radiation initiation studies were carried out at the SRI-CAT beamline 2-BM-B of the Advanced Photon Source with the energy attenuation as shown in FIG. 4. The sandwiched wafer system was mounted onto a thermally controlled aluminum backing plate, maintained at 50° C., in the path of the x-ray beam. This temperature was shown to be above the lower critical solution temperature, based on our chemically induced polymerization of the reactive mixture. Exposure was carried out through a gold mask to spatially control the exposures as shown in FIG. 1. After an exposure time of about 20 minutes (dosage ~500 a.u.), a hold time of 30 minutes was employed to allow the reaction to continue at 50° C. The reaction was then frozen by exposing the sandwiched wafer system to dry ice. The wafer system was dismantled in dry ice, and the polymerized film was washed with water and vacuum dried in a desiccator. The dry pattern obtained was examined by optical microscopy and was profiled using a depth profilometer.

Figure 5:
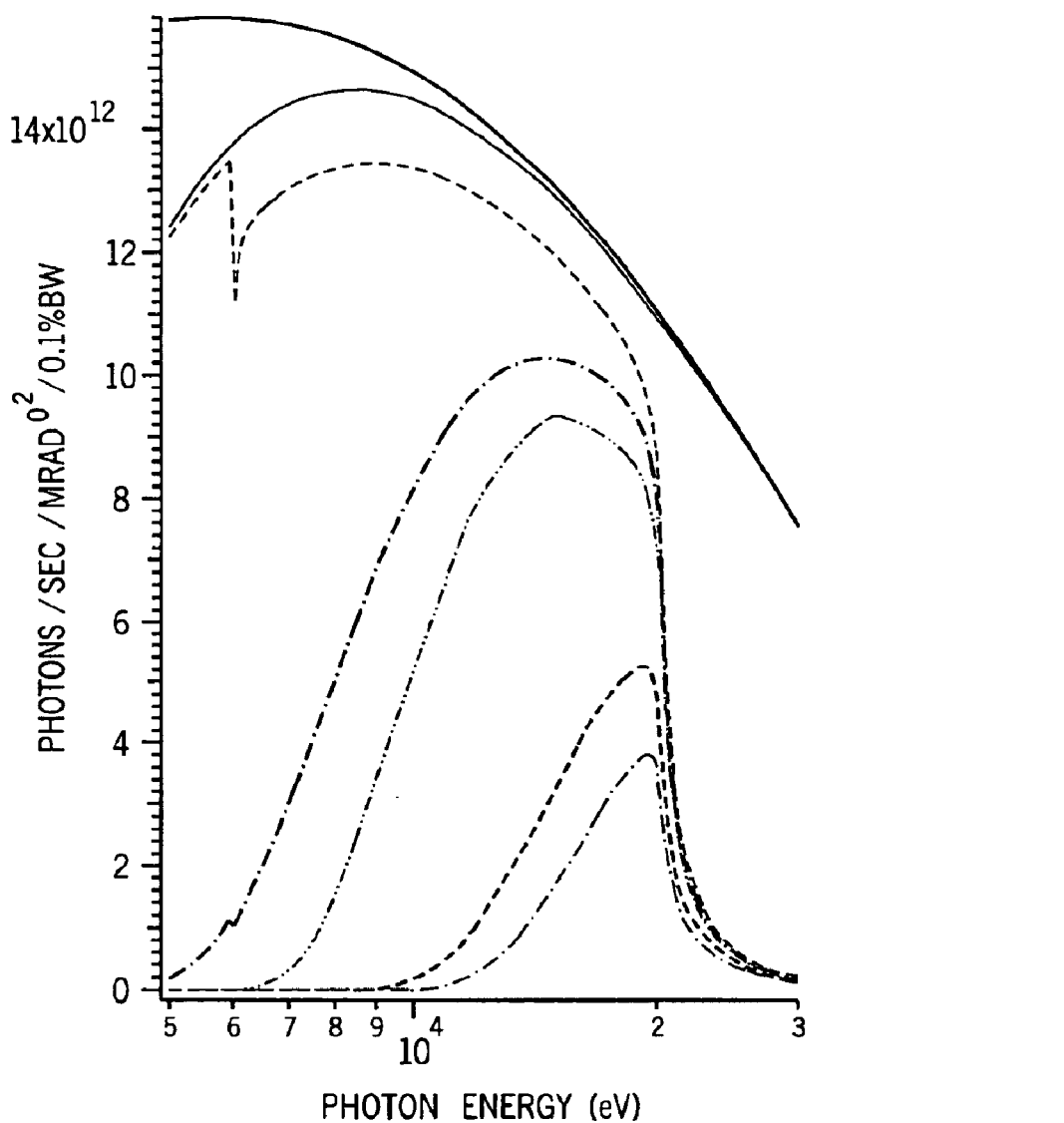
FIG. 5 depicts the surface profile of the grid lines indicating a 14-micrometer central plateau that is between two outlying peaks separated by 27 micrometers.

FIG. 5 shows the pattern of poly (N-isopropylacrylamide-co-calcium methacrylate) that was produced using a synchrotron radiation source. The polymer is the material that makes up the lines of the square grid pattern, and it was produced by spatially controlling the exposure of the monomer mixture using a patterned 50-micrometer-thick gold mask, microfabricated via photolithography and gold electroplating. The mask was made up of 500 μm squares of gold that are separated by a width of 25 micrometer. A closer examination of the lines (see FIG. 5 for a profile of the dry pattern) indicates that the edges are raised relative to its interior. The distance between the peaks is 27 micrometers, while the horizontal distance at the base is 59 micrometer. The central plateau region in the interior has a horizontal distance of 14 micrometers, which could be closer to 25 micrometers in wet state. The twin peaks in the profiles are uniformly present along the edges of the lines in FIG. 3, showing that there was controlled reaction outside the beam cross-section of 25 micrometers, which tends to form a less crosslinked material (polymer-lean phase) than what was produced within the beam cross section (polymer-rich phase). Therefore, it is clear that the polymer front did not extend beyond 20 micrometers or so from the exposed regions, and the intended square pattern shown in FIG. 3 was produced. The patterns produced, at the same dose and, have similar reaction spread, around the exposed regions. The extent of reaction spread can be further minimized depending on the dose rate, overall dose and temperature. At higher dose rates, the reaction should be faster leading to an instantaneous collapse of the polymer-rich phase, locking in the domain structure and thus spatial propagation.

EXAMPLE 3

Figure 6:
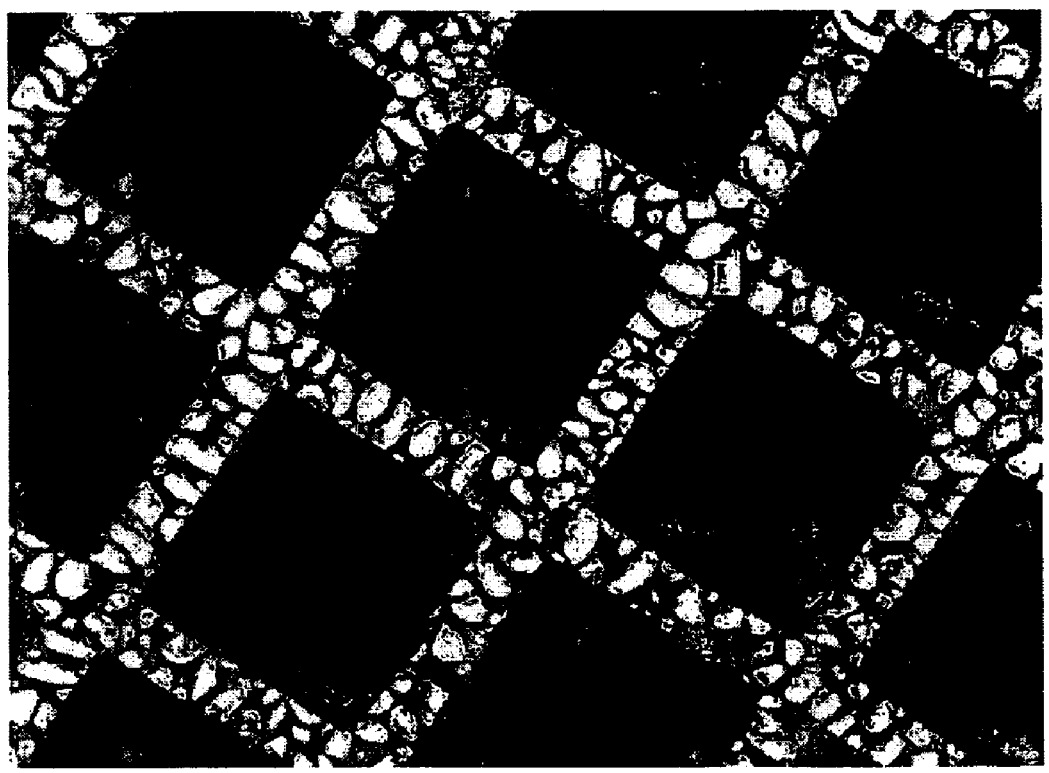
FIG. 6 is an optical micrograph of a 250-micron wide square-post of Poly (NIPAm) pattern that is 250-micron high. Note the arm extending from the bottom right corner of the square. The arm is 10-micron wide and 250-micron thick (aspect-ratio of 25)
Figure 7:
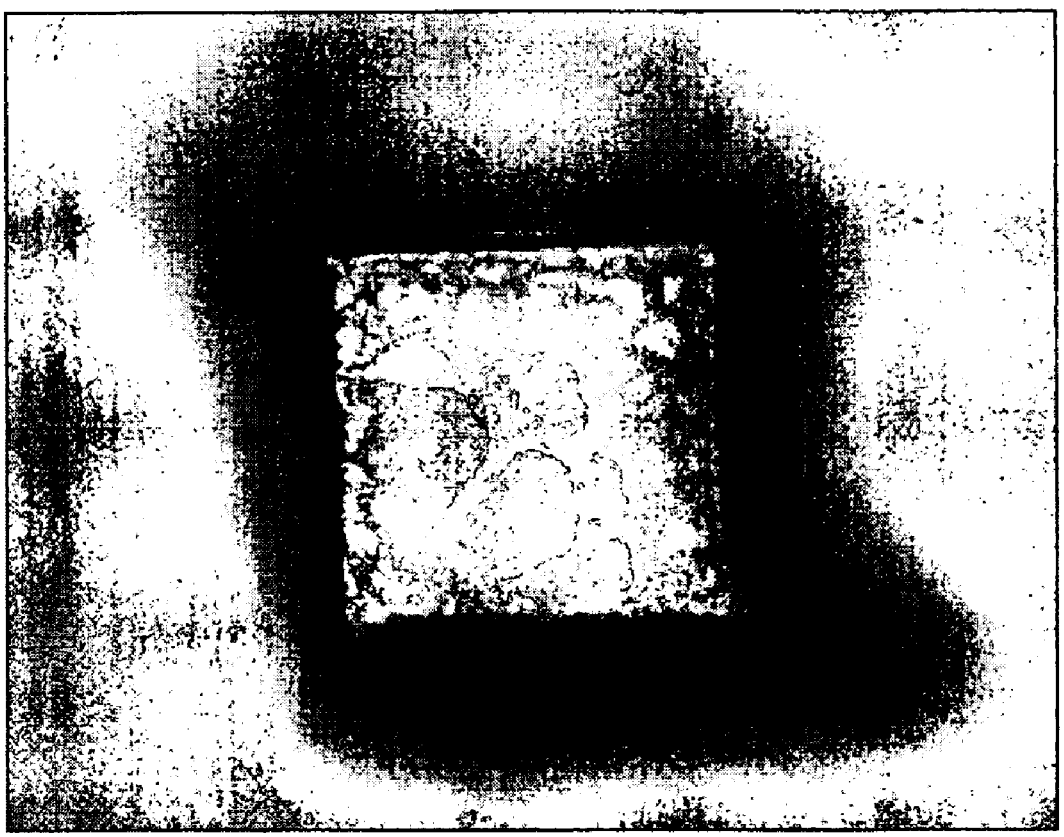
FIG. 7 is an optical micrograph of a 100-micron line grid pattern of Poly (NIPAm), with a aspect-ratio of 5 in a wet-state.

In Situ Fabrication of High Aspect-Ratio Thermoreversible Hydrogel Microstructures 20% N-isopropylacrylamide was dissolved in water, to which a 10% (wt./wt relative to N-isopropylacrylamide) N,N'-Methylene bisacrylamide was added as a crosslinker. The monomer mixture was introduced into a liquid cell consisting of two oxide-coated silicon wafers separated by a 125 micron-thick Kapton® spacer. The cell was sealed first with a Teflon® thread seal, and was taped using a Kapton® glue tape. Sealing with Teflon® thread seal prevents evaporation of water from the silicon chamber at high temperatures. The monomer mixture, maintained at 57° C., was exposed through a hard x-ray mask, made by the same procedure as explained in Example 1, for about 2.5 hrs to an overall dose of 2000 (a.u.). The smallest feature size on the mask was 10 microns, thus producing microstructures of aspect ratio ~25. {FIGS. 6, 7} The patterns produced were frozen in dry ice, before air drying in a chemical fume hood.

EXAMPLES 4

In Situ Fabrication of High Aspect-Ratio Ionic Hydrogel Microstructures

Figure 8:
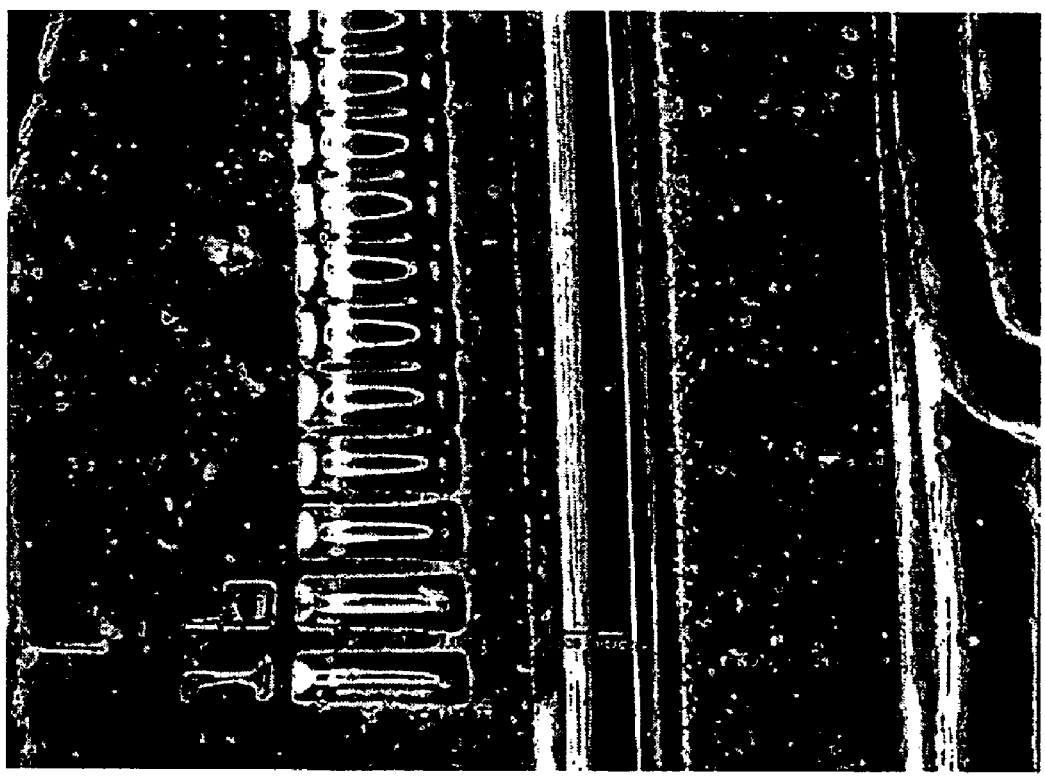
FIG. 8 is a dry-state optical micrograph of a Poly (methacrylic acid) pattern wherein the line underneath "16" in the image is ~16 microns wide.
Figure 9:
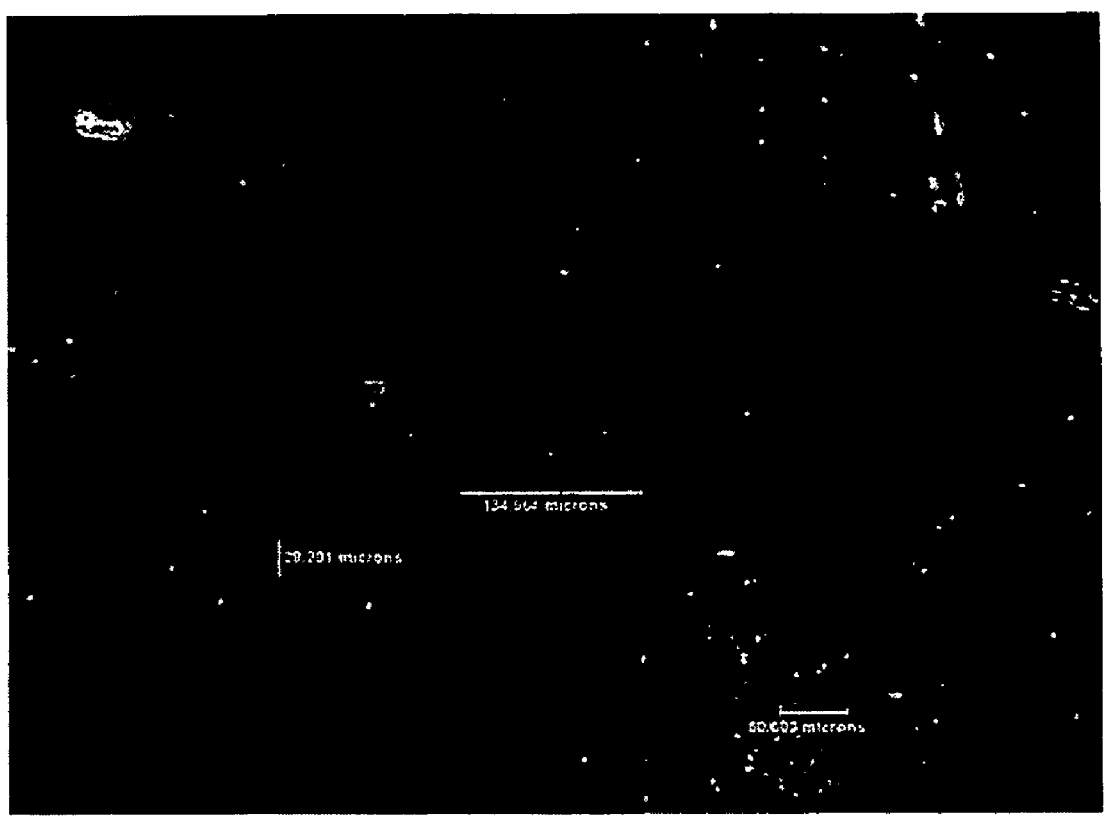
FIG. 9 is a wet-state optical micrograph of the pattern in FIG. 8.

Methacrylic acid belongs to the sub-class of ionic hydrogels, which respond to a change in its environmental pH. Methacrylic acid has a lower critical solution temperature of 42° C. in water. 20% Methacrylic acid was dissolved in water, in the presence of a crosslinker added at a 10% (wt/wt relative to methacrylic acid). No other chemical additives were added to the system. The solution of methacrylic acid and water was therefore captured and sealed as explained in example 2, and exposed to ionizing energy radiation for about 2 hours at 60° C., to a dose equivalent of 2000 arbitrary units. The cell was then dismantled in dry ice and air-dried in a fume hood. Hydrogel microstructures based on methacrylic acid having an aspect ratio of 10–15 were thus obtained. FIGS. 8 and 9 show optical micrographs of hydrogel microstructures based on poly (methacrylic acid) having an aspect ratio of 10–15.

EXAMPLE 5

Figure 10:
FIG. 10 is a an optical micrograph of one the 5 nm gold nanoparticles embedded within the 100-micron Poly (NIPAm) microstructure.
Figure 11:
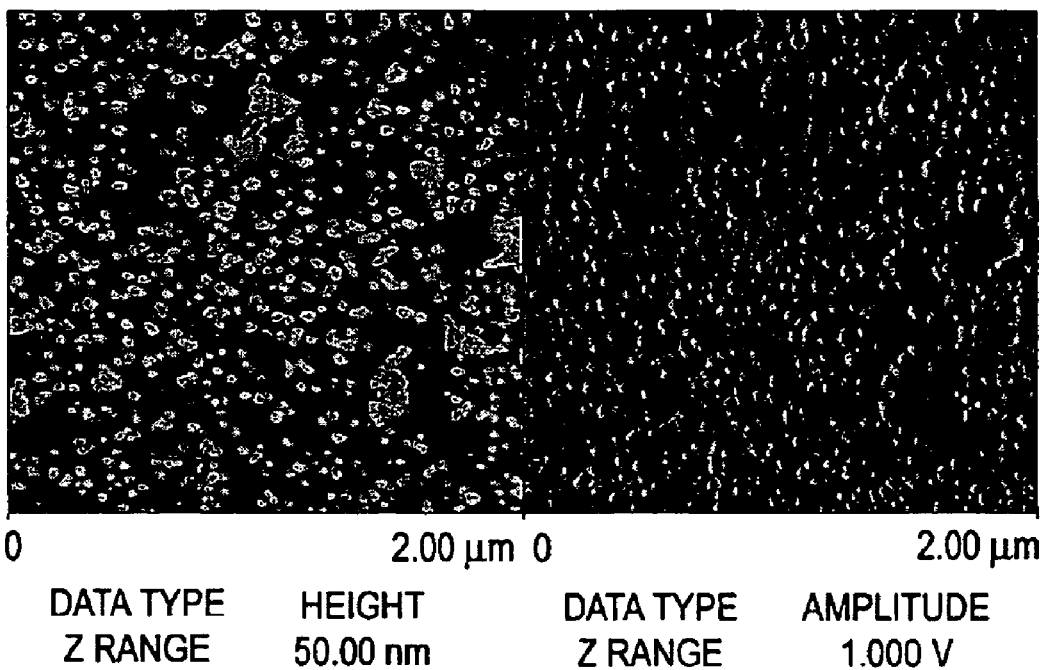
FIG. 11 is an atomic force microscope image of freeze-dried nanoparticles obtained from NIPAM-EGDMA polymerization in water, wherein the left frame is based on height, while the right frame is based on amplitude.
Figure 12:
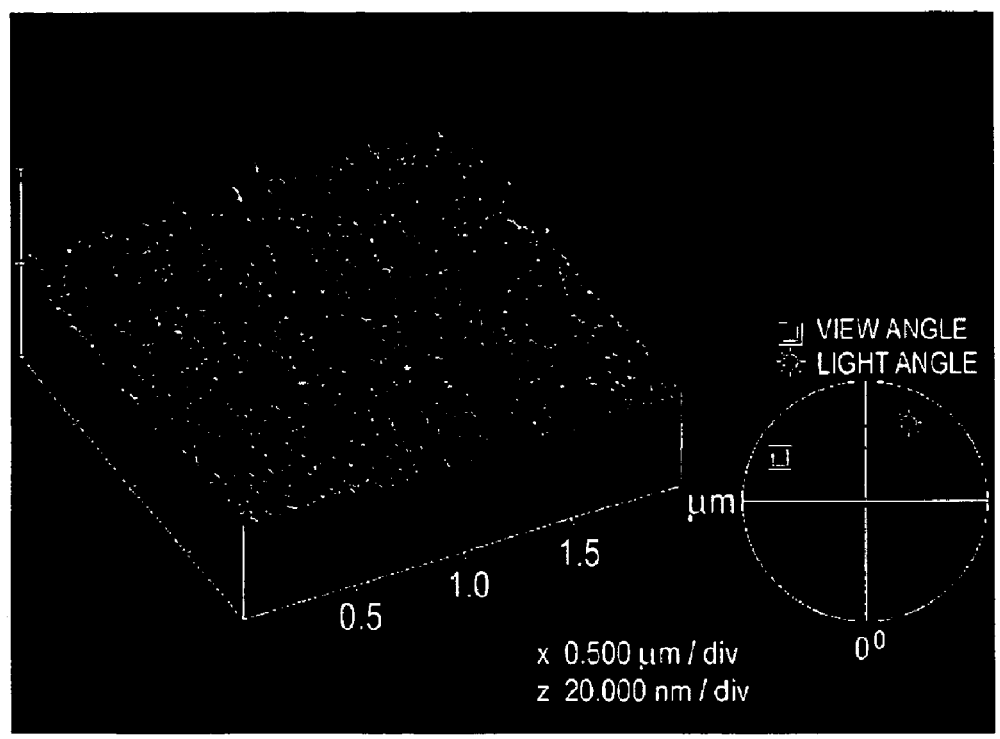
FIG. 12 is a surface profile of the freeze-dried poly (NIPAM-co-EGOMA) nanoparticles, from the quiescent-fluid FRRPP process from the atomic force microscope topograph of FIG. 11.

In Situ Fabrication of Nanocomposite Microstructures 0.9 g of N-isopropylacrylamide is dissolved in 4 g of 5 nm unconjugated gold nanoparticles 0.1 g of N,N'-Methylene bisacrylamide was added as a crosslinker to provide structural stability. The mixture was encapsulated in a sample chamber consisting of two silicon wafers. The monomer mixture was then exposed to ionizing energy ionizing radiation for a dose of 1500 a.u. (or 90 minutes of exposure) at 45° C. The chamber was dismantled after the exposure and the polymer patterns are air-dried at room temperature. Gold colloids suspended in the solution are trapped within the precipitating polymer, which binds them as the reaction proceeds. The 5 nm gold nanoparticles easily aggregate in presence of a foreign substance and are also characteristic of their emission in the 700 nm (red) wavelength range. [FIG. 10] The polymer gold nanocomposite patterns therefore appear in a pink or red color, depending on the size of the aggregates.

Crosslinked poly (N-isopropylacrylamide) microstructures were prepared from an x-ray-initiated controlled free-radical polymerization process. The concept of reaction control in chemically initiated retrograde precipitation systems has been verified in quiescent fluid reactor systems. As the reaction pathway does not depend on the method of initiation, the observed reaction control, which limits the extent of reaction propagation to produce nanoparticles in chemical-initiation systems could also be attributed to radiation-initiation systems. By combining with a "top-down" lithographic approach, this "bottom-up" synthesis method can be used to produce patterned micro and nanostructures. Since these hydrogels are prepared in a retrograde precipitation environment, they are usually macroporous and thus are capable of higher swelling rates compared to those of conventional hydrogels. The structures are also of high purity due to the absence of chemical mediators, making them attractive for various biological, pharmaceutical, and microfluidic applications.

While the invention has been described with specific embodiments, other alternatives, modifications and variations will be apparent to those skilled in the art. One of ordinary skill in the art would recognize that the steps of introducing the solvent and monomer into an admixture, along with the addition of any other desired reactants including fillers, need not be carried out in a specific order. Furthermore, the proportions of the monomer, solvent and other preferred reactants can be widely varied to allow for the desired yield, properties and kinetics of the polymerization reaction. All such alternatives, modifications and variations are intended to be included within the spirit and scope of the appended claims.

What is claimed is:

1. A method of synthesizing a polymer comprising the steps of:
   dispersing monomers in a solution;
   capturing the quiescent fluid solution in a liquid chamber;
   passing ionizing energy radiation through a means for screening and irradiating the solution to initiate polymerization to produce a polymer; and
   separating the polymer and the liquid chamber.

2. The method of claim 1, wherein the ionizing energy radiation comprises hard x-rays.

3. The method of claim 1, wherein the ionizing energy radiation comprises an electron beam from a scanning electron microscope.

4. The method of claim 1, wherein the polymerization occurs via a free-radical retrograde-precipitation reaction.

5. The method of claim 4, wherein the free-radical retrograde-precipitation polymerization occurs at greater then the lower critical solution temperature.

6. The method of claim 1, wherein the monomer comprises N-Isopropylacrylamide.

7. The method of claim 1, wherein ionizing energy radiation comprises soft x-rays.

8. The method of claim 1, wherein the liquid chamber comprises two silicone wafers.

9. The method of claim 1, wherein the solution comprises exposed to at least 300 a.u. of the ionizing energy radiation.

10. The method of claim 1, further comprising the additional step of:

dispersing metal nanoparticles in admixture with the monomers prior to polymerization.

11. The method of claim 1, wherein the polymer comprises a hydrogel.

12. The method of claim 10, wherein the hydrogel comprises a thermoreversible hydrogel.

13. A process of spatially controlling the synthesis of a polymer, comprising the steps of:

dispersing monomers in a solution;

adding a crosslinker to the solution;

irradiating the quiescent fluid solution with ionizing energy radiation through a radiation mask;

initiating a free-radical retrograde-precipitation polymerization reaction;

wherein the polymer formation is spatially controlled by the design of the radiation mask.

14. The process of claim 13, wherein the ionizing energy radiation comprises x-rays.

15. The process of claim 13, wherein the solution comprises a solvent with a high dissolution constant for the monomer and a low dissolution constant for the polymer.

16. The process of claim 13, wherein the polymer comprises a hydrogel.

17. The process of claim 13, wherein the hydrogel comprises a thermoreversible hydrogel.

* * * * *